US007814951B2

(12) United States Patent
Ochi

(10) Patent No.: US 7,814,951 B2
(45) Date of Patent: Oct. 19, 2010

(54) PNEUMATIC TIRE HAVING TREAD INCLUDING CONVEXLY CURVED FINE GROOVES

(75) Inventor: Naoya Ochi, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 958 days.

(21) Appl. No.: 10/570,685

(22) PCT Filed: Sep. 6, 2004

(86) PCT No.: PCT/JP2004/012930

§ 371 (c)(1),
(2), (4) Date: Jan. 4, 2007

(87) PCT Pub. No.: WO2005/023564

PCT Pub. Date: Mar. 17, 2005

(65) Prior Publication Data

US 2007/0089822 A1    Apr. 26, 2007

(30) Foreign Application Priority Data

Sep. 5, 2003    (JP)    ............................. 2003-313799

(51) Int. Cl.
B60C 11/03    (2006.01)
B60C 11/12    (2006.01)
(52) U.S. Cl. ........................... 152/209.18; 152/209.21; 152/209.28; 152/DIG. 3
(58) Field of Classification Search ............ 152/209.18, 152/209.19, 209.21, 209.28, DIG. 3
See application file for complete search history.

(56) References Cited

U.S. PATENT DOCUMENTS 4,299,264 A * 11/1981 Williams ................ 152/209.28

6,378,583 B1 * 4/2002 Fontaine ................ 152/209.28

(Continued)

FOREIGN PATENT DOCUMENTS

EP    194069    * 9/1986

(Continued)

OTHER PUBLICATIONS

Supplementary European Search Report dated Sep. 22, 2008.

*Primary Examiner*—Steven D Maki
(74) *Attorney, Agent, or Firm*—Sughrue Mion, PLLC

(57) ABSTRACT

A pneumatic tire which can enhance performance on snow while assuring performance in wet or dry condition is provided.

A plurality of inclined lateral grooves 16 which extend from the tread edge 12E toward the tire equatorial surface CL, being inclined with respect to the tire circumferential direction, are arranged in the tread 12 to establish the rotation directionality, whereby high performance in wet condition is obtained. In traveling on snow, the snow is got into the inclined lateral grooves 16, resulting in a force for shearing the snow column being obtained, thus basic performance in traveling on a snow covered road surface is provided. In the land portion 18 between inclined lateral grooves 16 adjoining in the circumferential direction, convexly curved line fine grooves 20 and sipes 22 are formed on the treading-in side, whereby a great edging effect is obtained in treading in the snow, which can enhance traction performance on snow. In addition, in the land portion 18, the kicking-out side is provided with less grooves than the treading-in side, having a higher rigidity, thus the land part rigidity as the entire land portion is assured, resulting in maneuvering performance in wet or dry condition being ensured.

10 Claims, 3 Drawing Sheets

U.S. PATENT DOCUMENTS

| | | | |
|---|---|---|---|
| D486,122 S | * | 2/2004 | Ratliff, Jr. .................. D12/540 |
| 6,837,285 B2 | * | 1/2005 | Eromaki ................ 152/209.28 |
| 2001/0017177 A1 | | 8/2001 | Himuro |

FOREIGN PATENT DOCUMENTS

| | | | |
|---|---|---|---|
| EP | 1048488 | * | 11/2000 |
| JP | 64-036505 | * | 2/1989 |
| JP | 5-278416 A | | 10/1993 |
| JP | 08-318708 | * | 12/1996 |
| JP | 9-109614 A | | 4/1997 |
| JP | 11-334319 | * | 12/1999 |
| JP | 2000-198321 A | | 7/2000 |
| JP | 2000-289413 | * | 10/2000 |
| JP | 2002-248906 A | | 9/2002 |
| JP | 2002-248909 A | | 9/2002 |
| JP | 2004-210189 A | | 7/2004 |
| WO | 99/17943 | * | 4/1999 |
| WO | 02/068221 A1 | | 9/2002 |

* cited by examiner

PNEUMATIC TIRE HAVING TREAD INCLUDING CONVEXLY CURVED FINE GROOVES

TECHNICAL FIELD

The present invention relates to a pneumatic tire.

BACKGROUND ART

Conventionally, the tread of a high performance all-season tire has had a pattern as shown in FIG. 3, for example, in which a plurality of circumferential main grooves 104 are provided; inclined lateral grooves 106 which open at the circumferential main groove 104 in the central area of the tire are arranged at equal intervals in the circumferential direction; and a number of land portions 108 are formed.

In addition, besides the pattern as shown in FIG. 3, patterns as illustrated in the following patent literatures 1 to 5 are available.

Patent literature 1: Japanese Patent Laid-Open Publication No. 03-38412/1991

Patent literature 2: Japanese Patent Laid-Open Publication No. 03-112704/1991

Patent literature 3: Japanese Patent Laid-Open Publication No. 05-278416/1993

Patent literature 4: Japanese Patent Laid-Open Publication No. 2002-248906

Patent literature 5: Japanese Patent Laid-Open Publication No. 2003-54224

DISCLOSURE OF THE INVENTION

Problems to Be Solved by the Invention

By the way, of any all-season tire, it is required not only that the traveling performance in wet or dry condition is provided, but also the performances on snow are prepared at high capability.

In order to assure the performances on snow with a configuration like the conventional pattern, the technique which increases the number of sipes (112, 114) which are evenly provided in the land portions 108 is generally taken, however, with this technique, attempting to improve the performances on snow may lower the rigidity of the land portion, leading to the degradation of the operating performance in wet or dry condition.

The present invention has been made in order to solve the above-mentioned problem, and the purpose thereof is to provide a pneumatic tire which can improve the performances on snow, while assuring the performance in wet or dry condition.

Arts to Solve the Invention

The invention as disclosed in the claim 1 provides a pneumatic tire comprising a plurality of inclined lateral grooves in a tread extending from a tread edge toward a tire equatorial surface and being inclined with respect to the tire circumferential direction, wherein a forward rotation direction is specified such that the inclined lateral grooves contact the ground from tire equatorial surface side thereof, a plurality of fine grooves that have narrower width than the inclined lateral grooves are formed in a land portion provided between adjacent inclined lateral grooves in the circumferential direction and, in a land portion, a region at a forward rotation direction side has a larger amount of edging function in the axial direction of the tire caused by the fine grooves than a region at an opposite side.

Next, the function of the pneumatic tire as disclosed in a first aspect of the present invention will be described.

Since a plurality of inclined lateral grooves are arranged in the tread, the grooves are inclined with respect to the tire circumferential direction and extend from a tread edge toward the tire equatorial surface, water in the tread surface can be drained with the inclined lateral grooves, thus the basic performance for wet condition when traveling on a wet road surface is obtained.

In addition, when traveling on a snowy road, the snow gets into the inclined lateral grooves, resulting in a force for shearing the snow column being obtained, thus the basic performances for snowy condition when traveling on the snowy road is provided.

Since a forward rotation direction is specified such that the inclined lateral groove contacts the ground from its tire equatorial surface side, the inclined lateral groove can smoothly drain the water at the tread surface from the tire equatorial surface side to outside of the tread edge, resulting in a high hydroplaning performance on the wet road surface being obtained.

With the conventional high-performance all season tire, relatively large blocks have been disposed, with sipes being disposed at relatively great intervals therein in order to achieve the operating performance in wet or dry condition compatible with the performances in snowy condition.

However, as a result of various experiments and examinations by the inventor, it has been revealed that, in order to enhance the traction capability of the performance in snowy condition, forming fine grooves (or sipes) on the forward rotation direction side (the treading-in side) to cause the edges to more effectively function in treading in the snow is more advantageous than forming fine grooves (or sipes) extending in the axial direction of the tire in the circumferential direction uniformly at the land part.

According to the present invention, a plurality of fine grooves which have narrower width than the inclined lateral groove are formed at the land portion provided between adjacent inclined lateral grooves in the circumferential direction, and a region at a forward rotation direction side has a larger amount of edging function in the axial direction of the tire caused by the fine grooves than a region at the opposite side. Thus, a great edging effect has been obtained when treading in the snow, which could have enhanced the traction performance in snowy condition.

In addition, the region at the opposite side to the forward rotation direction side has less fine grooves than the region at the forward rotation direction side at the land portion provided between the adjacent inclined lateral grooves in the circumferential direction and the land part has a higher rigidity. Thus, the land part rigidity is assured at the entire land portion, resulting in the maneuvering performance being ensured in the wet or dry condition.

A second aspect of the present invention provides a pneumatic tire comprising a plurality of inclined lateral grooves in a tread extending from a tread edge toward the tire equatorial surface and being inclined with respect to the tire circumferential direction wherein, a forward rotation direction is specified such that the inclined lateral groove contacts the ground from tire equatorial surface side thereof. The tire further comprises a land portion provided between adjacent inclined lateral grooves in the circumferential direction, wherein the land portion comprises a first land portion in which a plurality of fine grooves having a narrower width than the inclined lateral groove are formed and the region at a forward rotation direction side has a larger amount of edging function in the axial direction of the tire caused by the fine grooves than a region at an opposite side, and a second land portion which is disposed at the opposite side to the forward rotation direction with respect to the first land portion and is consecutive in a direction along the inclined lateral groove.

Since the region at the opposite side to the forward rotation direction in the land portion of the pneumatic tire of the second aspect is consecutive in the direction along the inclined lateral groove (the second land portion), the rigidity of the region at the opposite side to the forward rotation direction can be further increased, compared to that in the first aspect of the invention.

Furthermore, in a third aspect of the present invention, in the inclined lateral groove of the tread, in plane view, a groove wall on the tire forward rotation direction side is formed substantially in a shape of a straight line, while a groove wall on the opposite side is formed by connecting a plurality of convexly curved lines which expand toward the opposite side.

When traveling on a wet road surface, the water in the tread surface flows in the inclined lateral groove from the tire equatorial surface side to the tread edge side while being pressed against the wall surface on the forward rotation direction side of the inclined lateral groove (a kicking-out edge part of the land portion).

In the present invention, the groove wall on the forward rotation direction side of the inclined lateral groove is formed substantially in the shape of the straight line along the longitudinal direction of the groove, therefore, the water is allowed to be smoothly flown in the groove.

In addition, the groove wall on the opposite side to the forward rotation direction of the inclined lateral groove is formed by connecting a plurality of convexly curved line wall portions, thus engaging function of the land portion is increased in traction when traveling on snowy road.

As with the conventional pattern, when both of the groove walls at the treading-in side and the kicking-out side of the groove are straight or curvilinear rather than concaved and convexed and their angle with respect to the circumferential direction is relatively small (less than 60 deg), the snow got into the groove will be moved (flown), resulting in the snow column shearing force being difficult to act and less traction to be generated.

According to the present invention, as one of the groove walls is concaved and convexed in the longitudinal direction, the snow which is likely to move in the groove is tightened in the convexed portion and is reliably gripped within the groove, thereby an extremely high traction force is generated.

When braking on snow, the snow in the groove flows from the tread edge toward the tire equatorial surface side along the edge at the kicking-out side of the land portion.

With an inclined groove having groove wall figure which is straight or curvilinear rather than concaved and convexed, the snow is excessively gathered at the tread central area and crowded beyond the groove volume, which, in some case, made it impossible to discharge the snow resulting in tire slippage and the braking performance on snow being degraded.

On the other hand, with the inclined lateral groove of the present invention, the groove wall at the opposite side to the forward rotation direction side is formed by connecting a plurality of convexly curved wall portions, thus a force for shearing the snow column can be effectively generated and braking performance on snow is also enhanced similar to traction occurrence.

In a fourth aspect, the inclined lateral groove has at least three convexly curved portions at the groove wall located at the opposite side to the forward rotation direction side thereof. The convexly curved portions are respectively in a shape of a circular arc having a radius of curvature in the range of 10 to 200 mm, and the proportion of the minimum width to the maximum width of the inclined lateral grooves is in the range of 15 to 85%.

When the radius of curvature of the convexly curved portion in the inclined lateral groove is less than 10 mm, the number of convexly curved portions in the inclined lateral groove becomes too many, resulting in the drainage performance being degraded.

On the other hand, when the radius of curvature of the convexly curved portion in the inclined lateral groove exceeds 200 mm, the effect of tightening the snow which is apt to flow in the groove is lowered, resulting in less effective traction and braking performances.

In addition, when the proportion of the minimum width to the maximum width of the inclined lateral groove is less than 15%, the drainage performance is degraded.

On the other hand, if the proportion of the minimum width to the maximum width of the inclined lateral groove exceeds 85%, the effect of tightening the snow which is apt to flow in the groove is lowered, resulting in less effective traction and braking performances.

In a fifth aspect of the present invention, at the land portion, a plurality of convexly curved fine grooves which are convexed toward the opposite side to the forward rotation direction are formed as being connected along the inclined lateral groove. The fine grooves are provided next to the groove wall of the inclined lateral groove at the forward rotation direction side and direct toward the opposite side to the forward rotation direction without being opened at the inclined lateral groove at the opposite side of the forward rotation direction.

In the land portion, a plurality of convexly curved fine grooves which are convexed toward the opposite side to the forward rotation direction are formed as being connected along the inclined lateral groove. The fine grooves are provided next to the groove wall of the inclined lateral groove at the forward rotation direction side and direct toward the opposite side to the forward rotation direction side without being opened at the inclined lateral groove at the opposite side to the forward rotation direction. Thereby, the fine grooves are gathered on the treading-in side of the land portion and a configuration having a plurality of sub-land portions partitioned by the convexly curved fine grooves is produced on the treading-in side. Since these sub-land portions can be moderately moved when treading in, the edges of these sub-land portions can effectively function and the traveling performance on snow is enhanced. In addition, the convexly curved fine grooves have both the functions in the circumferential direction and in the axial direction of the tire, thus the sub-land portion function against forces from every direction, which contributes to enhancement of the performances of traction, braking, cornering, and the like.

Additionally, in a sixth aspect, the convexly curved fine grooves disposed at the tire equatorial surface side have narrower groove width than the convexly curved fine grooves disposed at the tread edge side.

The groove widths of the convexly curved fine grooves disposed at the tire equatorial surface side are set narrower, thus the tread rigidity in the vicinity of the tread center is assured, which allows the operating performance in traveling in either wet or dry conditions to be enhanced.

In addition, the groove widths of the convexly curved fine grooves at the tread edge side are set widely, thus the braking performance on snow can be assured.

In a seventh aspect, the sub-land portions between the convexly curved fine grooves and the inclined lateral groove at the forward rotation direction side to the convexly curved fine grooves, a plurality of land portion dividing fine grooves are formed, and the sub-land portions are divided into a plurality of junior-sub-land portions by the plurality of land portion dividing sub-grooves.

By forming land portion dividing fine grooves in the sub-land portion, the edging effect is further improved, which allows the performances on snow (for traction and braking) to be enhanced.

By adjusting the number of land portion dividing fine grooves (more grooves emphasize the performances on snow, while less grooves emphasize the performance in wet or dry condition), the performance balance can be tuned.

In an eighth aspect, land portion dividing fine grooves are formed to have groove widths in the range of 0.5 to 4.0 mm.

When the groove widths of the land portion dividing fine grooves are less than 0.5 mm, the sub-land portion cannot effectively function (to move) when contacting the ground, resulting in insufficient edging effect of the land portion dividing fine grooves.

On the other hand, when the groove widths of the land portion dividing fine grooves exceeds 4.0 mm, the function that the kicking-out side of the land portion supports the treading-in side of the land portion is lowered when contacting the ground, resulting in a lean degree of the land portions becoming excessive. This may cause the traveling performance in wet or dry condition being adversely affected.

In a ninth aspect, convexly curved fine grooves are formed to have larger groove widths than the land part dividing fine grooves.

Since the groove widths of the convexly curved fine grooves are larger than the groove widths of the land part dividing fine grooves, the sub-land portion can function effectively when contacting the ground.

Furthermore, in a tenth aspect, the tread comprises at least one circumferential main groove at the center thereof in the axial direction of the tire, and the inclined lateral grooves are not connected to the circumferential main groove.

In the tread center, since the circumferential main groove which is consecutive in the circumferential direction is provided, the drainage performance is enhanced and thus, the hydroplaning performance is improved.

In addition, as the inclined lateral grooves are not connected to the circumferential main groove, the rigidity at the tread central area is assured and the operating performance of traveling in the wet or dry condition is ensured.

EFFECT OF THE INVENTION

As described above, the pneumatic tire as disclosed in the first aspect has an excellent effect that performance on snow can be enhanced while performance in wet or dry condition being assured.

The pneumatic tire as disclosed in the second aspect has an excellent effect that performance on snow can be enhanced while performance in wet or dry condition exceeds that of the pneumatic tire configured according to the first aspect.

The pneumatic tire of the third aspect has an excellent effect that, in traveling on a wet road surface, the water in the tread surface can be smoothly flown in the inclined lateral groove, and in traveling on snow, superior traction performance and braking performance are obtained.

The pneumatic tire of the fourth aspect has an excellent effect that drainage performance, traction performance, and braking performance can be realized.

The pneumatic tire of the fifth aspect has an excellent effect that the sub-land portion can function against forces from any directions, resulting in excellent performance for traction, braking, cornering, and the like.

The pneumatic tire of the sixth aspect has an excellent effect that operating performance in traveling in either wet or dry conditions can be enhanced and braking performance on snow can be assured.

The pneumatic tire of the seventh aspect has an excellent effect that edging function can be improved and performance on snow (for traction and braking) can be enhanced.

The pneumatic tire of the eighth aspect has an excellent effect that edging function of the land portion dividing fine grooves can be sufficiently provided without adversely affecting traveling performance in dry or wet condition.

The pneumatic tire of the ninth aspect has an excellent effect that the sub-land portions can effectively function in ground contacting.

Finally, the pneumatic tire of the tenth aspect has an excellent effect that hydroplaning performance can be enhanced. In addition, it has an excellent effect that the rigidity in the tread central area can be assured and operating performance in either wet or dry conditions can be ensured.

BEST MODE FOR CARRYING OUT THE INVENTION

First Embodiment

Figure 1:
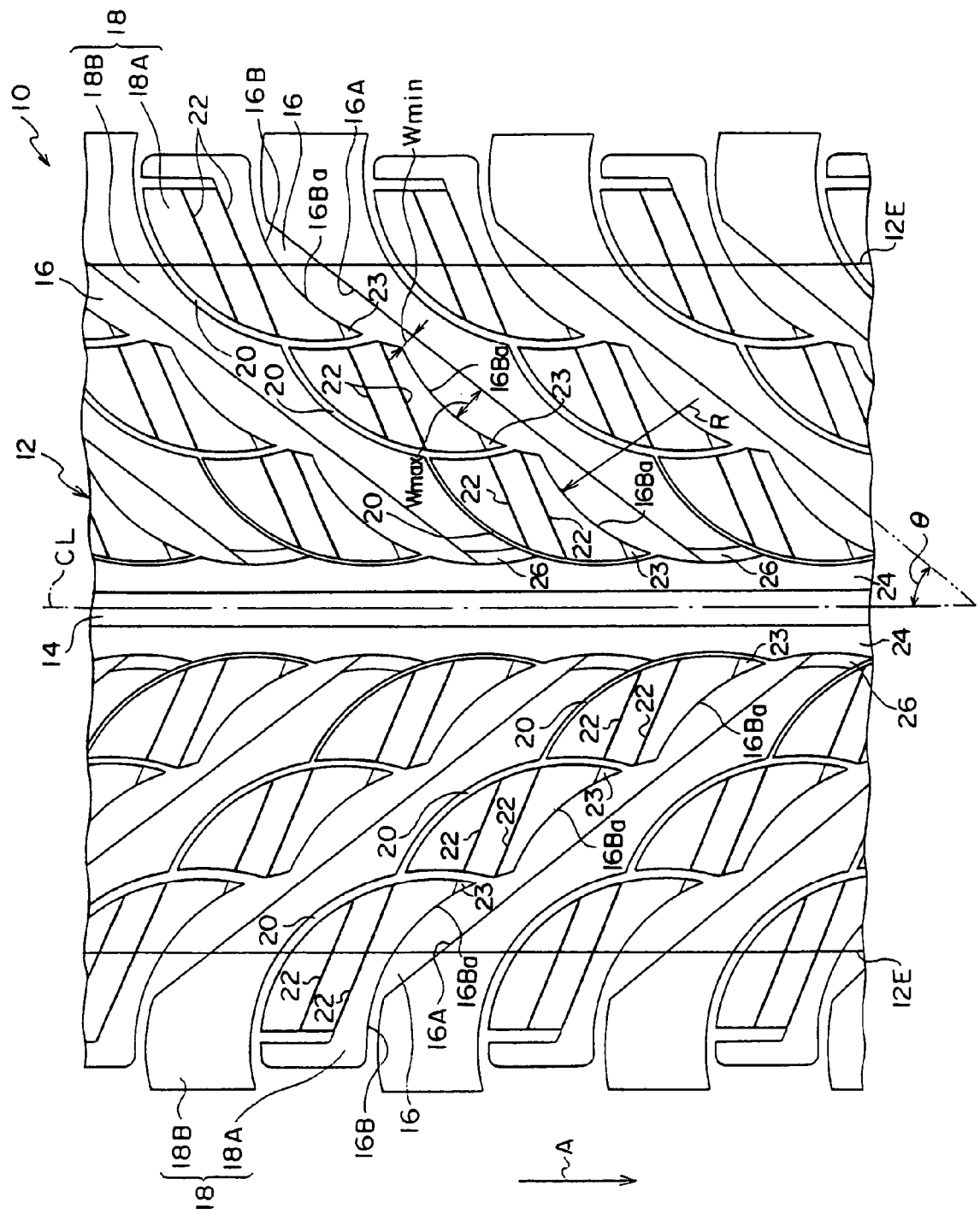
FIG. 1 is a plan view of a tread of a pneumatic tire pertaining to the first embodiment of the present invention.

Herein below, the first embodiment of the present invention will be described in detail with reference to the drawing.

As shown in FIG. 1, a circumferential main groove 14 in the shape of a straight line is formed on the tire equatorial surface CL on a tread 12 of a pneumatic tire 10 of the present embodiment. The circumferential main groove 14 may be formed by two or more, depending upon the application.

The groove width is set at 7.8 mm and the groove depth is set at 8.5 mm for the circumferential main groove 14 of the present embodiment.

On the left side of the tire equatorial surface CL, a plurality of inclined lateral grooves 16 which extend upper leftward are formed in the circumferential direction, while, on the right side of the tire equatorial surface CL, a plurality of inclined lateral grooves 16 which extend upper rightward are formed in the circumferential direction.

For the pneumatic tire 10 of the present embodiment, the forward rotation direction is specified such that the inclined lateral grooves 16 contact the ground first from their end parts on the tire equatorial surface CL side (an arrow A in the drawing indicates the tire forward rotation direction specified).

One end of respective inclined lateral groove 16 is terminated at the vicinity of the circumferential main groove 14, while the other end thereof is opened at a tread edge 12E of the tread 12.

The tread edge 12E refers to that which is provided when the pneumatic tire 10 is loaded on a standard rim as specified in the JATMA YEARBOOK (2003 edition, giving The Japan Automobile Tire Manufacturers Association Standard); is filled with air to an inflation pressure of 100% of the pneumatic pressure (the maximum pneumatic pressure) corresponding to the maximum load carrying capacity (a load indicated with bold characters in the inflation pressure-load carrying capacity correspondence table) for the applicable size and ply rating in the JATMA YEAR BOOK; and is subjected to the maximum load. Depending on the place of use or manufacture, the TRA Standard or the ETRTO Standard is applicable, the definition of the tread edge 12E shall be in conformity with those standards.

According to the tread 12 in plane view, the groove wall 16A on the tire forward rotation direction side of the inclined lateral groove 16 is formed in the shape of a straight line, while the groove wall 16B on the opposite side is formed by connecting a plurality of convexly curved wall portions 16Ba which are convexed toward the opposite side in the shape of a circular arc.

The number of convexly curved wall portions 16Ba to be connected in a single inclined lateral groove 16 is preferably 3 or more.

In the present embodiment, the angle θ of the inclined lateral groove 16 with respect to the circumferential direction is 40 deg, however, the angle θ may differ other than 40 deg, and may vary gradually.

The radius of curvature R for the convexly curved wall portion 16Ba is preferably in the range of 10 to 200 mm.

In addition, for the inclined lateral groove 16, the proportion of its minimum width $W_{min}$ to its maximum width $W_{max}$ is preferably in the range of 15 to 85%.

With the inclined lateral groove 16 in the present embodiment, three convexly curved wall portions 16Ba are connected; the radius of curvature R for respective convexly curved wall portion 16Ba is 40 mm; and the ratio of the minimum width (3 mm) $W_{min}$ to the maximum width (8 mm) $W_{max}$ is set at 37.5%.

The groove depth for the inclined lateral groove 16 is set at 8.5 mm.

In the land portion 18 between adjacent inclined lateral grooves 16 in the circumferential direction, a plurality of convexly curved fine grooves 20 which are convexed in the direction opposite to the tire forward rotation direction are formed along the longitudinal direction of the inclined lateral groove 16.

The convexly curved fine groove 20 is formed as a circular arc shape with one end at the tire equatorial surface CL side being opened at the groove wall 16B of the inclined lateral groove 16, and the other end on the opposite side being connected to an intermediate portion in the longitudinal direction of adjoining convexly curved fine groove 20 which locates outside in the tire width direction.

It is preferable to set the groove width of the convexly curved fine groove 20 on the tread edge 12E side more widely than the groove width of the convexly curved fine groove 20 on the tire equatorial surface CL side.

The convexly curved fine grooves 20 in the present embodiment are provided with groove widths of 0.8 mm, 1.5 mm, and 2.0 mm, in order starting from the groove 20 nearest to the tire equatorial surface CL.

The land portion 18 between inclined lateral grooves 16 adjoining in the circumferential direction is divided into a plurality of first land portions 18A at the tire forward rotation direction side and a second land portion 18B having the shape of a rib at the side opposite to the tire forward rotation direction by the plurality of convexly curved fine grooves 20.

The second land portion 18B continues from the tire equatorial surface CL side to the tread edge 12E side along the inclined lateral groove 16.

In the first land portion 18A, a plurality of sipes 22 (two in the present embodiment) extending substantially in the axial direction of the tire are formed.

The groove width of each sipe 22 is set narrower than that of the convexly curved fine groove 20. The groove width of the sipe 22 is preferably in the range of 0.5 to 4.0 mm. In the present embodiment, the groove width of the sipe 22 is set at 0.5 mm.

In addition, in an end part of the first land portion 18A at the tire equatorial surface CL side, a chamfer 23 is formed.

At both sides of the circumferential main groove 14, circumferential direction land parts 24 are provided which extend consecutively in the circumferential direction.

A chamfer 26 is formed in the end part of the second land portion 18B at the tire equatorial surface CL side. The land portion 18 and the circumferential direction land part 24 are separated from each other by the inclined lateral groove 16, the chamfer 26, and the convexly curved fine groove 20.

The width (a maximum value) of the circumferential direction land part 24 is 8.5 mm in the present embodiment.

(Function)

The function of the pneumatic tire 10 of the present embodiment will be described.

A plurality of inclined lateral grooves 16 are arranged in the tread 12 to establish the directionality, which extend from the tread edge 12E toward the tire equatorial surface CL and are inclined with respect to the tire circumferential direction. Further, the circumferential main groove 14 which is consecutive in the circumferential direction is provided in the tire equatorial surface CL, thus high drainage performance and high hydroplaning performance are obtained.

Since the inclined lateral grooves 16 are not connected to the circumferential main groove 14, the rigidity at the tread central area is assured with maneuvering performance when traveling in either wet or dry conditions being ensured.

In traveling on snow, the snow is got into the inclined lateral grooves 16, resulting in a force for shearing the snow column being obtained, thus basic traveling performance on a snow covered road surface is provided.

In the land portion 18 between the inclined lateral grooves 16 adjoining in the circumferential direction, the region at the forward rotation direction side has a larger amount of edging function in the axial direction of the tire due to the fine grooves (the convexly curved fine grooves 20 and the sipes 22), compared to the region at the opposite side, thus a great edging effect is obtained in treading into snow, which can enhance the traction performance on snow.

In this land portion 18, the region at the opposite side to the forward rotation direction side has less fine grooves (convexly curved fine grooves 20 and sipes 22) than the region at the forward rotation direction side and has a higher rigidity, thus a land portion rigidity as the entire land portion is assured, resulting in maneuvering performance in wet or dry condition being ensured.

When traveling on a wet road surface, the water in the tread surface flows in the inclined lateral groove 16 from the tire equatorial surface CL side to the tread edge 12E side, and at that time, the water can smoothly flow in the groove because the groove wall 16A at the forward rotation direction side of the inclined lateral groove 16 is formed in the shape of a straight line.

In addition, the groove wall 16B of the inclined lateral groove 16 is formed by connecting a plurality of convexly curved wall portions 16Ba, thus engaging portions for traction of the land portion in traveling on snow is increased. In addition, as the groove wall 16B is concaved and convexed in the longitudinal direction, the snow which is apt to move in the groove can be tightened in the convexed portion (the portion where the groove width is narrower), which allows the snow to be reliably gripped in the groove, and thus an extremely high traction force is generated.

When braking on snow, the snow in the inclined lateral groove 16 is liable to flow from the tread edge 12E side toward the tire equatorial surface CL side along the edge at the kicking-out side of the inclined lateral groove 16, however, the edge of the kicking-out side of the inclined lateral groove 16, i.e., the groove wall 16B is formed by connecting a plurality of convexly curved wall portions 16Ba according to the present embodiment, thus it provides a resistance against the flow of the snow in the groove, which allows a force for shearing the snow column to be effectively generated, resulting in braking performance on snow being also enhanced similar to a traction force.

When the radius of curvature of the convexly curved wall portion 16Ba in the inclined lateral groove 16 is reduced to less than 10 mm, the number of convexly curved wall portions 16Ba in the inclined lateral groove 16 becomes too many, resulting in the drainage performance being degraded.

On the other hand, when the radius of curvature for the convexly curved wall portion 16Ba in the inclined lateral groove 16 is increased to exceed 200 mm, the effect of tightening the snow which is apt to flow in the groove is lowered, resulting in unfavorable traction and braking performance.

In addition, if the proportion of the minimum width to the maximum width of the inclined lateral groove 16 is reduced to fewer than 15%, the drainage performance is degraded.

On the other hand, if the proportion of the minimum width to the maximum width of the inclined lateral groove 16 exceeds 85%, the tightening function for the snow which is liable to flow in the groove is lowered, resulting in unfavorable traction and braking performance.

In the land portion 18, the plurality of first land portions 18A, which are partitioned by the convexly curved fine grooves 20, are moderately moved in treading in, thus in traveling on snow, the edging by the first land portions 18A can effectively function, which enhances traveling performance on snow.

In addition, the convexly curved fine groove 20 has both the portions functionable in the tire circumferential direction and in the tire axial direction, thus it can cause the edging of the first land portion 18A to function against the forces in any direction, which contributes to enhance performance for traction, braking, cornering, and the like.

The respective groove width of the convexly curved fine grooves 20 is set narrower at the tire equatorial surface CL side than at the tread edge 12E side, thus the tread rigidity in the vicinity of the tread center is assured, which allows maneuvering performance in traveling in either wet or dry conditions to be enhanced.

In addition, the groove width of the convexly curved fine groove 20 on the tread edge 12E side is wider, thus braking performance on snow can be assured.

In the first land portions 18A, sipes 22 are formed, which increases the edging effect, allowing performances on snow (for traction and braking) to be enhanced.

By adjusting the number of sipes 22 (more will emphasize performances on snow, while less will emphasize maneuvering performance in wet or dry condition), performance balance can be tuned.

When the groove width of the sipe 22 is less than 0.5 mm, the first land portion 18A cannot effectively function (to move) in ground contacting, resulting in the edging effect of the sipe 22 being deteriorated.

On the other hand, if the groove width of the sipe 22 exceeds 4.0 mm, the land portion on the kicking-out side can not effectively support the land portion on the treading-in side when contacting the ground, leaning of the land portions becomes excessive, resulting in traveling performance in wet or dry condition being adversely affected.

By setting the groove width of the convexly curved fine groove 20 more largely than the groove width of the sipe 22, the first land portion 18A can effectively function in ground contacting.

Second Embodiment

Herein below, a second embodiment of the present invention will be described in detail with reference to the drawing. The same configuration as that in the first embodiment will be provided with the same numeral and the description thereof will be omitted.

Figure 2:
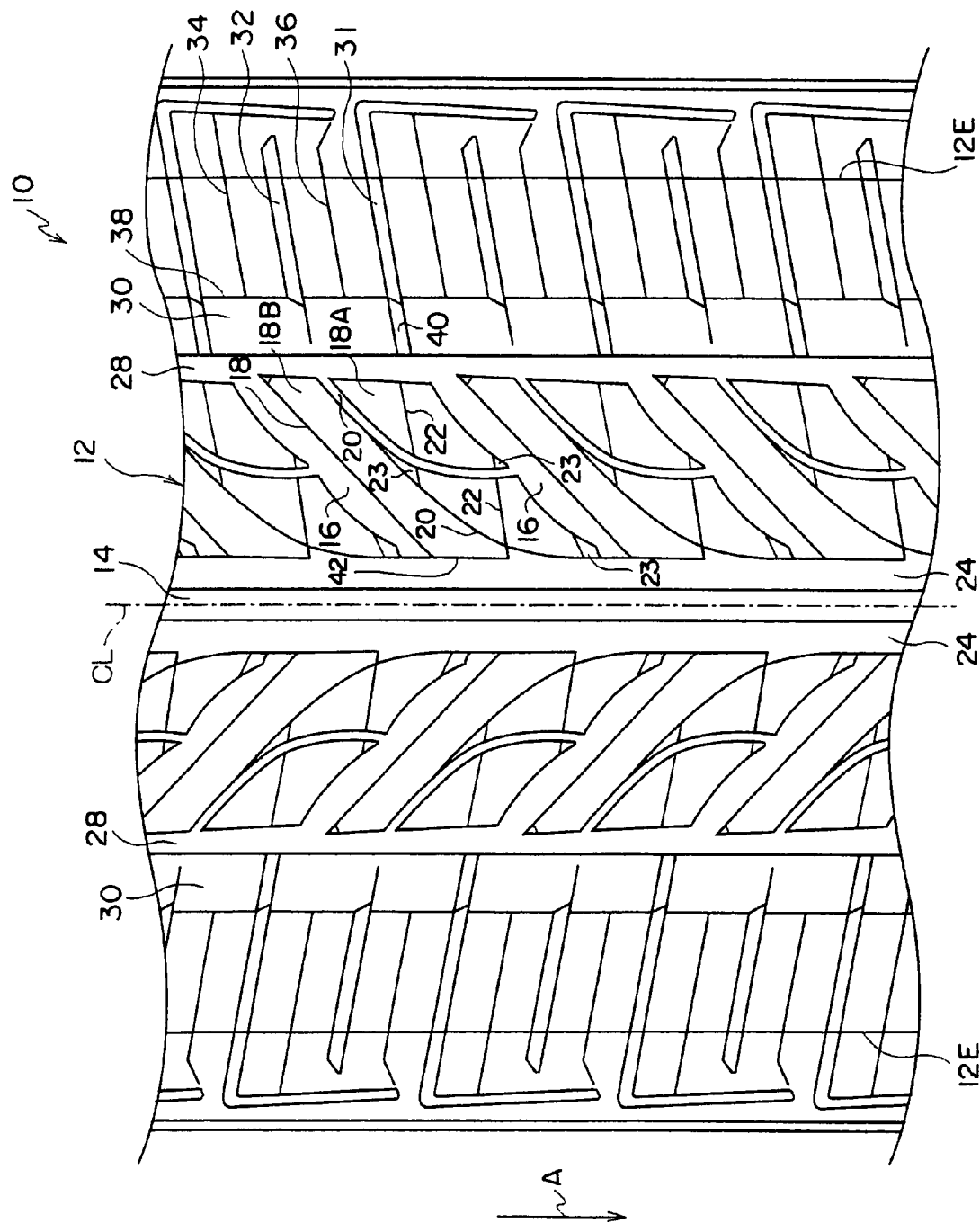
FIG. 2 is a plan view of a tread of a pneumatic tire pertaining to the second embodiment of the present invention.

As shown in FIG. 2, the pattern of the pneumatic tire 10 in the present embodiment is somewhat different from that in the first embodiment, the second circumferential main grooves 28 are formed in the circumferential direction on both sides of the main groove 14, and on a shoulder side of the respective second circumferential main grooves 28, shoulder blocks 30 being partitioned by the second circumferential main groove 28 and lateral grooves 31.

In each of the shoulder blocks 30, a lateral groove 32, a lateral sipe 34, a lateral sipe 36, a longitudinal sipe 38, and a chamfer 40 are formed.

In addition, between the circumferential direction land part 24 and the second land portion 18B of the land portion 18, sipes 42 are formed. In the present embodiment, the groove width of the convexly curved fine groove 20 at the circumferential main groove 14 side is set narrower than that of the convexly curved fine groove 20 at the second circumferential main groove 28 side, and is as narrow as the sipe.

Like in the first embodiment, in the land portion 18 between inclined lateral grooves 16 adjoining in the circumferential direction, the region at the forward rotation direction side has a large amount of edging functions in the axial direction of the tire due to the fine grooves (the convexly curved fine grooves 20 and the sipes 22), compared to the region at the opposite side, thus a great edging effect is obtained in treading into snow, which can enhance traction performance on snow.

In addition, in the land portion 18, the region at the opposite side to the forward rotation direction side provides the second land portion 18B which is highly rigid with no fine grooves and sipes being formed therein, thus the land portion rigidity as the entire land portion is assured, resulting in maneuvering performance in wet or dry condition being ensured.

TEST EXAMPLES

Example

The pneumatic tire 10 in the above-described embodiments is provided.

Conventional Example

Figure 3:
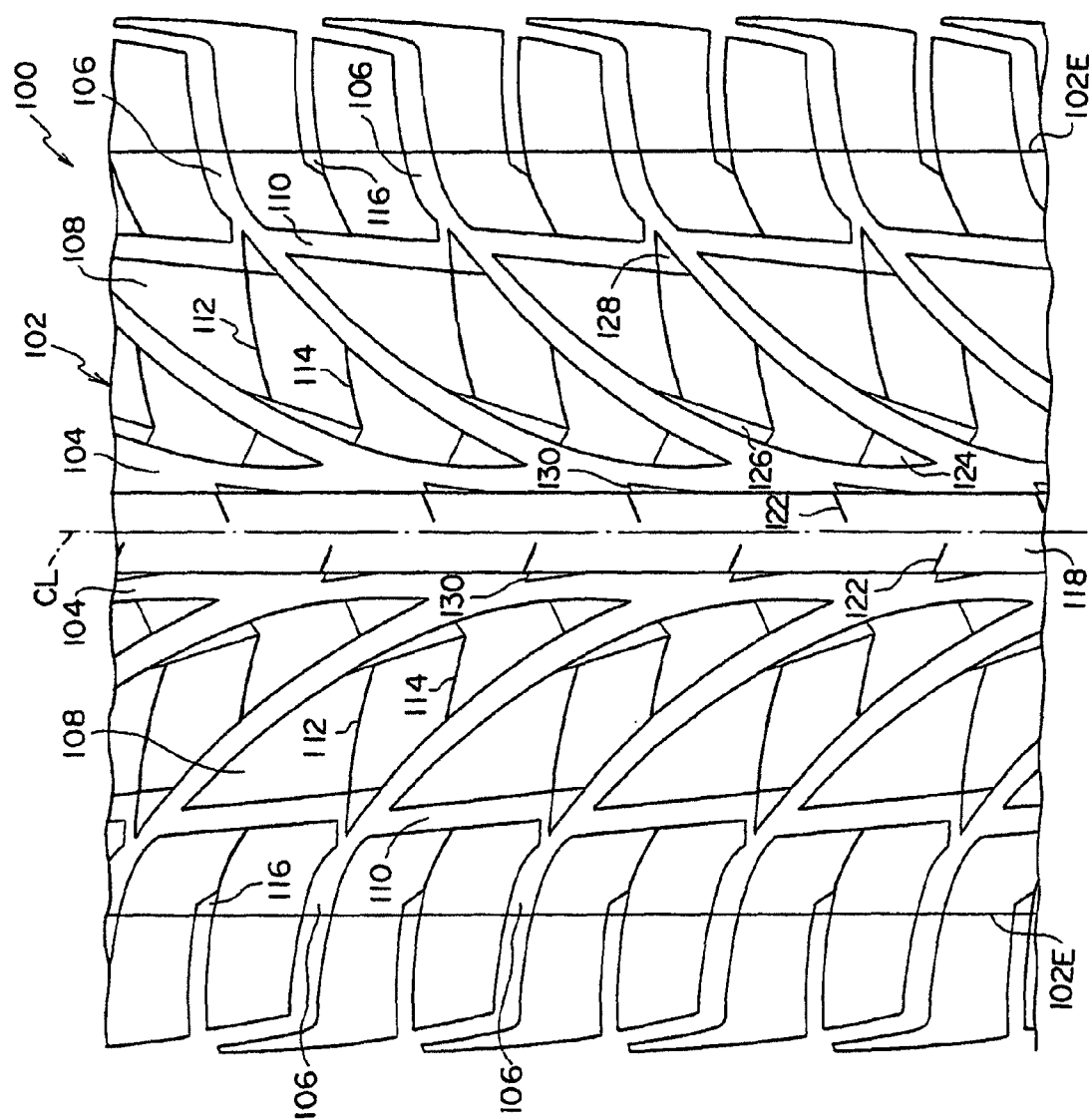
FIG. 3 is a plan view of a tread of a pneumatic tire pertaining to a conventional example.

As shown in FIG. 3, in the tread 102 of a tire 100 in the conventional example, circumferential main grooves 104 are formed on both sides of the tire equatorial surface CL, and a plurality of inclined lateral grooves 106 which extend from a tread edge 102E so as to be connected to the circumferential main groove 104 are formed in the circumferential direction on both sides of the tire equatorial surface CL.

These inclined lateral grooves 106 extend left upward on the left side of the tire equatorial surface CL, while they extend right upward on the right side of the tire equatorial surface CL.

In addition, in the land portion 108 between inclined lateral grooves 106 adjoining in the circumferential direction, a circumferential sub-groove 110 which is somewhat inclined with respect to the tire circumferential direction, sipes 112 and 114 which extend substantially in the axial direction of the tire, and a lateral groove 116 are formed.

Further, in the land portion 118 having the shape of a rib and being located between the pair of circumferential main grooves 104, short sipes 122 are formed in both sides thereof.

In the land portion 108, the numerals 124, 126, and 128 indicate chamfered portions.

In the land portion 118, the numeral 130 indicates a projection in the shape of a slender triangle and being chamfered entirely.

Test Conditions, Test Method, and Evaluation Method

A set of tires of the Example according to the present invention and a set of tires of the conventional example, both having a tire size of 205/55R16, were respectively loaded on a vehicle to carry out various tests. The inflation pressure was 230 kPa, and the load applied was equivalent to the mass of two persons to be on the vehicle.

Sense on Snow: A comprehensive evaluation by a test driver for braking performance, starting performance, straight-line performance, cornering performance on a test course having compacted snowy surface. The evaluation is expressed in exponential notation assuming the value for the conventional example is 100, and the higher the value the more excellent the performance.

Braking on Snow: A measurement of the braking distance when full braking is applied at the point of 40 km/h on compacted snow. The evaluation is expressed in exponential notation assuming the reciprocal of the braking distance for the conventional example is 100, and the higher the value the more excellent the performance.

Traction on Snow: A measurement of the acceleration time from zero speed over a distance of 50 m on compacted snow. The evaluation is expressed in exponential notation assuming the acceleration time for the conventional example is 100, and the higher the value the more excellent the performance.

Wet hydroplaning Performance: A feeling evaluation by a test driver at a hydroplaning occurring limit speed in traveling on a wet road having a water depth of 5 mm. The evaluation is expressed in exponential notation assuming the value for the conventional example is 100, and the higher the value the more excellent the performance.

Dry Maneuvering Stability: A feeling evaluation by a test driver in sport traveling in various modes of travel on a circuit course in dry conditions. The evaluation is expressed in exponential notation assuming the value for the conventional example is 100, and the higher the value the more excellent the performance.

Wet Maneuvering Stability: A feeling evaluation by a test driver in sport traveling in various modes of travel on a circuit course in wet conditions. The evaluation is expressed in exponential notation assuming the value for the conventional example is 100, and the higher the value the more excellent the performance.

TABLE 1

|  | Conventional example | EXAMPLE |
|---|---|---|
| Sense on Snow | 100 | 120 |
| Braking on Snow | 100 | 112 |
| Traction on snow | 100 | 210 |
| Wet Hydroplaning Performance | 100 | 102 |
| Dry Maneuvering Stability | 100 | 102 |
| Wet Maneuvering Stability | 100 | 104 |

As a result of the tests, it has been found that the set of tires of the Example according to the present invention are excellent in performance for all the items, compared to the set of tires in the conventional example.

INDUSTRIAL APPLICABILITY

The tire according to the present invention can provide high traveling performance not only in either wet or dry conditions, but also on snowy surface.

What is claimed is:

1. A pneumatic tire comprising a plurality of inclined lateral grooves in a tread extending from a tread edge toward a tire equatorial surface and being inclined with respect to a tire circumferential direction, with a forward rotation direction being specified such that the inclined lateral grooves contact the ground from a tire equatorial surface side thereof, wherein a plurality of fine grooves that have narrower widths than the inclined lateral grooves are formed in respective land portions provided between adjacent inclined lateral grooves in the circumferential direction and, in a land portion, a region at a forward rotation direction side has a larger amount of edging function in the axial direction of the tire caused by the fine grooves than a region at an opposite side, wherein at the land portion, a portion of the plurality of fine grooves are convexly curved toward the opposite side to the forward rotation direction and are formed so as to be connected along the inclined lateral groove, the convexly curved fine grooves are provided so as to direct from the groove wall of the inclined lateral groove at the forward rotation direction side toward the opposite side to the forward rotation direction without being opened at the inclined lateral groove located at the opposite side to the forward rotation direction.

2. A pneumatic tire comprising a plurality of inclined lateral grooves in a tread extending from a tread edge toward a tire equatorial surface and being inclined with respect to a tire circumferential direction, with a forward rotation direction being specified such that the inclined lateral grooves contact the ground from a tire equatorial surface side thereof, wherein the tire further comprises a land portion provided between adjacent inclined lateral grooves in the circumferential direction, and the land portion comprises a first land portion in which a plurality of fine grooves having narrower width than the inclined lateral groove are formed and which has a larger amount of edging function in the axial direction of the tire caused by the fine grooves at a region at a forward rotation direction side than a region at an opposite side, and a second land portion which is disposed at the opposite side to the forward rotation direction with respect to the first land portion and is consecutive in a direction along the inclined lateral groove, wherein at the land portion, a portion of the plurality of fine grooves are convexly curved toward the opposite side to the forward rotation direction and are formed so as to be connected along the inclined lateral groove, the convexly curved fine grooves are provided so as to direct from the groove wall of the inclined lateral groove at the forward rotation direction side toward the opposite side to the forward rotation direction without being opened at the inclined lateral groove located at the opposite side to the forward rotation direction.

3. The pneumatic tire of claim 1, wherein in each of the inclined lateral grooves of the tread, in plane view, a groove wall on the forward rotation direction side is formed substantially in a shape of a straight line along a groove longitudinal direction, while a groove wall on the opposite side is formed as connecting a plurality of convexly curved lines which expand toward the opposite side to the forward rotation direction.

4. The pneumatic tire of claim 3, wherein each of the inclined lateral grooves has at least three convexly curved portions at the groove wall located at the opposite side to the forward rotation direction side, and the convexly curved portions are respectively in a shape of a circular arc having a radius of curvature in the range of 10 to 200 mm, and the proportion of the minimum width to the maximum width of the inclined lateral grooves is in the range of 15 to 85%.

5. The pneumatic tire of claim 1, wherein the convexly curved fine grooves disposed at the tire equatorial surface side have narrower groove widths than the convexly curved fine grooves disposed at the tread edge side.

6. The pneumatic tire of claim 1, wherein the land portion comprises sub-land portions between the convexly curved fine grooves and the inclined lateral grooves located at the forward rotation direction side of the convexly curved fine grooves, a plurality of land portion dividing fine grooves are formed on the sub-land portions, and the sub-land portions are divided into a plurality of junior-sub-land portions by the plurality of land portion dividing fine grooves.

7. The pneumatic tire of claim 6, wherein the land portion dividing fine grooves have groove widths in the range of 0.5 to 4.0 mm.

8. The pneumatic tire of claim 6, wherein the convexly curved fine grooves have larger groove widths than the land portion dividing fine grooves.

9. The pneumatic tire of claim 1, wherein the tread comprises at least one circumferential main groove at the center thereof in the axial direction of the tire, and the inclined lateral grooves are not connected to the circumferential main groove.

10. The pneumatic tire of claim 9 further comprising a circumferential direction land part that is provided between the circumferential main groove and the inclined lateral grooves.

\* \* \* \* \*